United States Patent
Bae et al.

(10) Patent No.: US 7,474,414 B2
(45) Date of Patent: *Jan. 6, 2009

(54) SYSTEM AND METHOD OF GUIDING REAL-TIME INSPECTION USING 3D SCANNERS

(75) Inventors: Seock Hoon Bae, Gyeonggi (KR); Tae Joo Kim, Seoul (KR)

(73) Assignee: Inus Technology, Inc. (KR)

( * ) Notice: Subject to any disclaimer, the term of this patent is extended or adjusted under 35 U.S.C. 154(b) by 75 days.

This patent is subject to a terminal disclaimer.

(21) Appl. No.: 11/284,180

(22) Filed: Nov. 21, 2005

(65) Prior Publication Data

US 2006/0274327 A1    Dec. 7, 2006

(30) Foreign Application Priority Data

Jun. 1, 2005    (KR)    ................. 10-2005-0046859

(51) Int. Cl.
*G01B 11/24*    (2006.01)

(52) U.S. Cl. ..................... 356/601; 356/608

(58) Field of Classification Search ............. 356/601, 356/607, 608, 237.2
See application file for complete search history.

(56) References Cited

U.S. PATENT DOCUMENTS

| | | | |
|---|---|---|---|
| 6,095,145 A * | 8/2000 | Sadlo | 128/844 |
| 7,156,655 B2 * | 1/2007 | Sachdeva et al. | 433/24 |
| 7,234,937 B2 * | 6/2007 | Sachdeva et al. | 433/24 |
| 2002/0006597 A1 * | 1/2002 | Andreiko et al. | 433/24 |
| 2004/0029068 A1 * | 2/2004 | Sachdeva et al. | 433/24 |
| 2004/0115586 A1 * | 6/2004 | Andreiko et al. | 433/3 |
| 2004/0136002 A1 * | 7/2004 | Whaite et al. | 356/419 |
| 2005/0265598 A1 * | 12/2005 | Noguchi et al. | 382/167 |

OTHER PUBLICATIONS

U.S. Appl. No. 11/284,148, filed Nov. 21, 2005, Seock Hoon Bae et al.
U.S. Appl. No. 11/284,182, filed Nov. 21, 2005, Seock Hoon Bae et al.
U.S. Appl. No. 11/284,181, filed Nov. 21, 2005, Seock Hoon Bae et al.

* cited by examiner

*Primary Examiner*—Roy M Punnoose
(74) *Attorney, Agent, or Firm*—Harness, Dickey & Pierce, P.L.C.

(57) ABSTRACT

A system and a method of guiding a real-time inspection using a 3D scanner are provided. The system and the method of guiding a real-time inspection using a 3D scanner allow an operator to perform an accurate and swift inspection of an object to be measured so as to meet a designer's design intentions. For that purpose, 3D shape information of an object to be measured is detected using a scanner and shape information and inspection guide information of the object stored in a data storage unit, and inspection information of the object for judging the validity of the measurement information detected from the scanner is checked through a display unit. After that, the scanner is operated to compare the measurement information detected by the scanner with the inspection information so as to judge the validity of the measurement. Therefore, an operator can accurately understand a designer's intentions for inspection to perform measurement.

17 Claims, 3 Drawing Sheets

SYSTEM AND METHOD OF GUIDING REAL-TIME INSPECTION USING 3D SCANNERS

BACKGROUND OF THE INVENTION

1. Field of the Invention

The present invention relates to a system and a method of guiding a real-time inspection using a 3-dimensional (3D) scanner, and more particularly, to a system and a method of guiding a real-time inspection using a 3D scanner so that an operator may perform an accurate and swift inspection of an object to be measured in accordance with the designer's design intentions.

2. Description of the Related Art

Measurement using a 3D scanner can obtain shape information of an object by digitally processing an image obtained by simply photographing the object using imaging equipment without directly contacting the object to be measured.

The measurement using a 3D scanner is used for obtaining shape information of an object that is easily damaged when external force is applied to the object to be measured or a high-precision, small-sized component, as in the cases of manufacturing a semiconductor wafer, measuring a precise instrument, and recovering a 3D image.

Particularly, a 3D scanner has the advantage of more economically and precisely measuring 3D information, since 3D scanners combine optical devices with computer image processing technology to measure digital image information using low-cost image input devices such as scanners instead of high-cost auxiliary devices such as interferometers or laser light sources to obtain a digital image.

The measurement using the 3D scanner is performed by seating an object (whose shape information is to be measured) on a cradle and measuring the shape information of the object in a 3D non-contact manner with the scanner.

Also, when the shape information of an object is measured in a 3D non-contact manner, an operator must repeat the operation of rotating the object at various angles and measuring the object with the scanner so as to measure a dead zone, which the light source of the scanner does not reach.

The inspection using the above 3D scanner can easily obtain shape information of an object in the case where the dexterity of an operator manipulating the 3D scanner and the performance of the 3D scanner are both exceptional. On the contrary, in the case where an operator is unskilled and the performance of the 3D scanner is unfavorable, inspection elements required for measurement are not accurately scanned.

Also, in the case where a designer who has designed an object to be measured cannot accurately deliver inspection elements (e.g., the shape of an object, the dimensions of a measured object, and an allowable tolerance) to an operator manipulating the 3D scanner, the accurate inspection that the designer intended cannot be performed properly.

SUMMARY OF THE INVENTION

Accordingly, the present invention is directed to a system and a method of guiding a real-time inspection using a 3D scanner that substantially obviates one or more problems due to limitations and disadvantages of the related art.

It is an object of the present invention to provide a system and a method of guiding a real-time inspection using a 3D scanner so that an operator may accurately measure inspection elements of an object intended by a designer, regardless of the operator's dexterity at manipulating a 3D scanner.

To accomplish the above object and other advantages, there is provided a system of guiding a real-time inspection using a 3D scanner including: a scanner for detecting 3D shape information of an object to be measured; a data storage unit for storing inspection guide information of the object to be measured by an operator who manipulates the scanner and inspection information of the object required for judging the validity of the measurement information (3D shape information) detected by the scanner; a display unit for outputting the measurement information detected by the scanner and the inspection guide information of the object stored in the data storage unit; and a control unit for transmitting the inspection guide information of the object stored in the data storage unit to the display unit, and comparing the measurement information detected by the scanner with the inspection information in order to judge the validity of the measurement.

Also, the inspection guide information may include shape information of the object, scanning region information used for measuring the object, and order information used for guiding a measurement process.

Also, the shape information of the object may be design data modeled in a CAD (computer-aided design) program.

Also, the inspection information may include reference data information used for judging whether the number of data of the measurement information detected by the scanner is valid and allowable tolerance information used for appraising a shape error of the measurement information.

Also, the data storage unit may include at least one of a hard disk, a semiconductor memory, and a CD-ROM.

In another aspect of the present invention, there is provided a method of guiding a real-time inspection using a 3D scanner comprising the steps of: (a) defining shape information of an object to be measured and a measurement element of the object and storing the same in a data storage unit; (b) outputting, at a control unit, shape information for guiding measurement of the object and inspection guide information to a display unit using the shape information and the measurement element stored in the data storage unit; (c) measuring and detecting, at the control unit, a shape of the object from a 3D (3-dimensional) scanner; (d) judging, at the control unit, validity of the measurement information (shape of the object) detected from the 3D scanner; and (e) ending, at the control unit, the measurement of the object if the measurement information is valid as a result of the judgment in the step (d).

Also, the step (b) may include the steps of: detecting, at the control unit, measurement position and measurement dimension information of the object stored in the data storage unit; and setting shape information of the object and a scanning region required for measuring a shape of the object to output the set information and the set scanning region to the display unit.

Also, the step (c) may include the steps of: detecting, at the control unit, space-movement information detected from the 3D scanner; analyzing, at the control unit, the space-movement information detected from the 3D scanner to judge whether the 3D scanner is disposed in a vicinity of the object; and displaying, at the control unit, that the object is an object to be measured through the display unit if the 3D scanner is disposed in the vicinity of the object.

Also, the step of judging whether the 3D scanner is disposed in a vicinity of the object may include the step of displaying, at the control unit, that the object is not an object to be measured through the display unit if the 3D scanner is not disposed in the vicinity of the object.

Also, the step (c) may include the step of superposing, at the control unit, the information measured from the 3D scanner on the shape information for guiding measurement of the object and outputting the superposed information to the display unit.

Also, the step (d) may include the steps of: comparing, at the control unit, the number of data of the information measured from the 3D scanner with a first reference value for judging the validity of the measured information; and calculating, at the control unit, numerical information of the measurement element from the measured information and comparing the numerical information with a second reference value for judging validity of the measured information, if the number of data of the measured information is valid as a result of the comparison.

Also, if the number of data of the measured information is not valid, the step (c) may be performed.

Also, if the calculation result of the measured information is not valid, the step (c) may be performed.

Also, if there exists additional measurement of an object in the step (e), the control unit may perform the step (b).

It is to be understood that both the foregoing general description and the following detailed description of the present invention are exemplary and explanatory and are intended to provide further explanation of the present invention as claimed.

BRIEF DESCRIPTION OF THE DRAWINGS

The accompanying drawings, which are included to provide a further understanding of the present invention and are incorporated in and constitute a part of this application, illustrate embodiment(s) of the present invention and together with the description serve to explain the principle of the present invention. In the drawings.

DETAILED DESCRIPTION OF THE PREFERRED EMBODIMENTS

Reference will now be made in detail to a preferred embodiment of the present invention.

Figure 1:
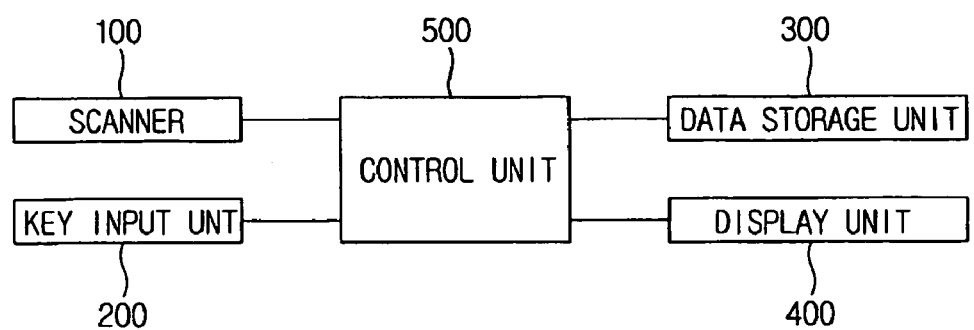
FIG. 1 is a block diagram of a system of guiding a real-time inspection using a 3D scanner according to the present invention.
Figure 2:
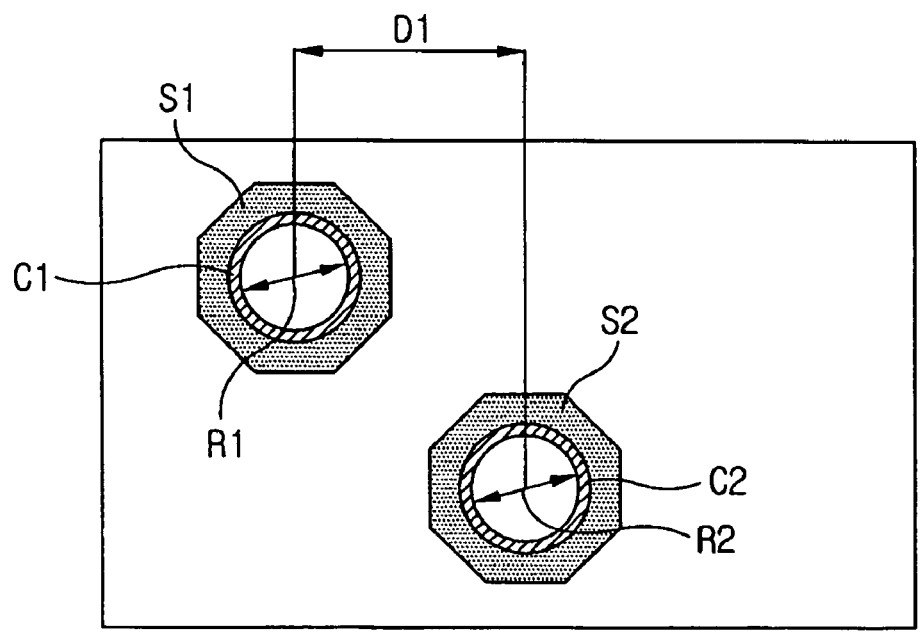
FIG. 2 is an exemplary view of a measurement process using the system of guiding a real-time inspection using the 3D scanner of FIG. 1.
Figure 3:
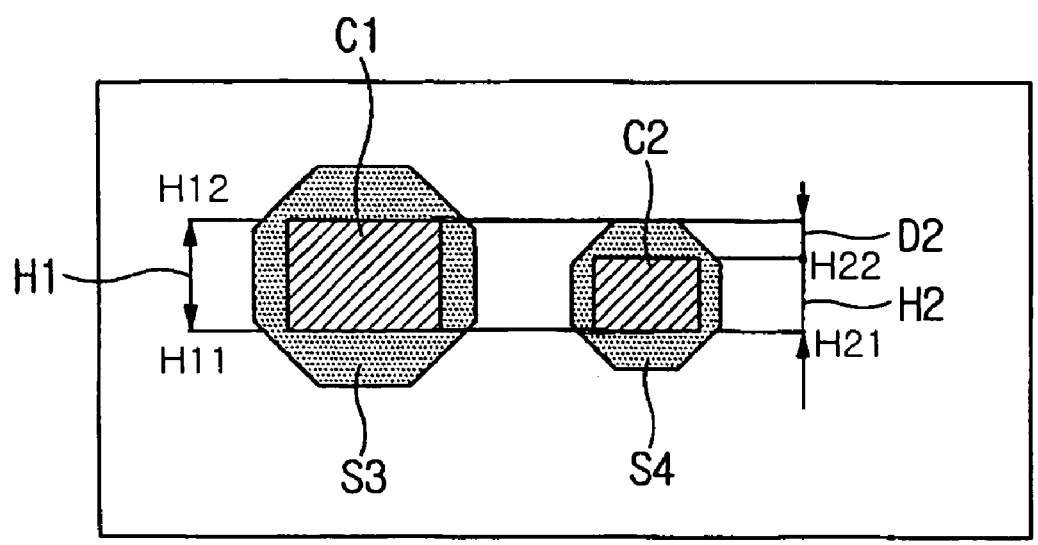
FIG. 3 is another exemplary view of a measurement process using the system of guiding a real-time inspection using the 3D scanner of FIG. 1.

FIG. 1 is a block diagram of a system of guiding a real-time inspection using a 3D scanner according to the present invention, FIG. 2 is an exemplary view of a measurement process using the system of guiding a real-time inspection using the 3D scanner of FIG. 1, and FIG. 3 is another exemplary view of a measurement process using the system of guiding a real-time inspection using the 3D scanner of FIG. 1.

The system of guiding a real-time inspection using a 3D scanner according to the present invention will be described with reference to FIGS. 1 through 3.

The system includes a 3D scanner (100) for scanning an object to be measured; a data storage unit (300) for storing shape information, inspection information, and inspection guide information of the object; a display unit (400) for outputting measurement information detected from the 3D scanner 100 and the inspection guide information of the object stored in the data storage unit (300); and a control unit (500) for controlling the overall operation of the system.

The 3D scanner (100) is a means for obtaining shape information of an object to be measured. Since the construction of the 3D scanner and a scanning process thereof is well known in the art, detailed description thereof will be omitted.

The 3D scanner (100) applied to the present invention may be a portable 3D scanner (100) and the measurement information of the object obtained by the 3D scanner (100) is provided to the control unit (500).

The data storage unit (300) stores inspection guide information of an object to be measured by an operator manipulating the 3D scanner (300) and inspection information of the object used for judging validity of measurement information of the object detected by the 3D scanner (100). The data storage unit (300) may be at least one of a hard disk, a semiconductor memory, and a CD-ROM, but preferably, a hard disk.

Also, the inspection guide information includes shape information of the object, scanning region information used for measuring the object, and order information used for guiding the measurement process. The shape information of the object of the inspection guide information is design data modeled by a computer-aided design (CAD) program.

Also, the scanning region information used for measuring the object of the inspection guide information is intended for an operator to obtain shape information of a part of an object that needs actual measurement or an item designed by a designer. For example, referring to FIGS. 2 and 3, the scanning region information allows an operator to detect that the first cylinder C1 and the second cylinder C2, having different heights, are spaced a predetermined distance from the object to be measured.

That is, referring to FIG. 2, in the case where measurement elements to be detected and measured from the object are the first cylinder C1 and the second cylinder C2, the first scanning region S1 and the second scanning region S2, in which the first and second cylinders C1 and C2 are included, are outputted to allow an operator to check which part of the object the operator should detect using the 3D scanner (100). Also, it may be possible to allow an operator to perform checking in more detail by additionally outputting the shapes of the first and second cylinders C1 and C2 that are objects to be measured in the first and second scanning regions S1 and S2, and it is possible to guide an operator to the height of the scanner (100) to be positioned from the object to be measured so that an operator may measure the object.

For example, referring to FIG. 3, in the case where measurement elements to be detected and measured from the object are the heights of the first and second cylinders C1 and C2, the third and fourth scanning regions S3 and S4 are set and outputted so that the heights of the lowest point H11 and the highest point H12 of the first cylinder C1 and the heights of the lowest point H21 and the highest point H22 of the second cylinder C2 may be included. Accordingly, an operator can easily check the scanning region, and the quadrangular shapes of the first and second cylinders C1 and C2 may be outputted together.

Also, the order information of the inspection guide information is intended for sequentially guiding an inspection-progress process. For example, the circumferential shapes of the first and second cylinders C1 and C2 are outputted to obtain measurement information and then the side shapes of the first and second cylinders C1 and C2 are outputted, so that an operator may recognize a measurement order.

Also, the inspection information includes reference data information used for judging whether the number of data of the measurement information detected by the 3D scanner (100) is valid and allowable tolerance information used for appraising a shape error of the information measured from the object by the 3D scanner (100). That is, the reference data information is the number of effective data used for judging whether the number of data detected from the 3D scanner (100) is more than a predetermined value, and the allowable tolerance information is a design value set for calculating the thickness and the height of a shape using data detected from the 3D scanner 100 and judging whether the calculated value is valid.

For example, referring to FIGS. 2 and 3, calculation values of the inner radii R1 and R2 of the first and second cylinders C1 and C2, the distance D1 between central points of the first and second cylinders C1 and C2, the heights H1 and H2 of the first and second cylinders C1 and C2, and a height difference (H12-H22: D2) of the first and second cylinders C1 and C2 are compared with design values to judge whether the calculated values are valid information.

The inspection guide information and the inspection information are set on the basis of design data of the object to measured.

The display unit (400) outputs shape information of the object measured by the 3D scanner (100), the inspection guide information, the inspection information stored in the data storage unit (300), and measurement result information, for an operator to check.

The control unit (500) controls the shape information where a measurement element of the object is defined, the inspection guide information, and the inspection information to be stored in the data storage unit (300); outputs a control signal so that the shape information (where a measurement element of the object is defined), the inspection guide information, and the inspection information stored in the data storage unit (300) through the display unit (400); controls measurement information transmitted from the 3D scanner (100) to be outputted through the display unit (400); and compares the information measured by the 3D scanner (100) with the inspection information stored in the data storage unit (300) to judge the validity of the measurement information.

An unexplained reference numeral 200 is a key input unit. The key input unit is intended for inputting a control signal for manipulating an operation of the 3D scanner (100), and inputting inspection information and allowable error information of an object to the data storage unit (300).

Figure 4:
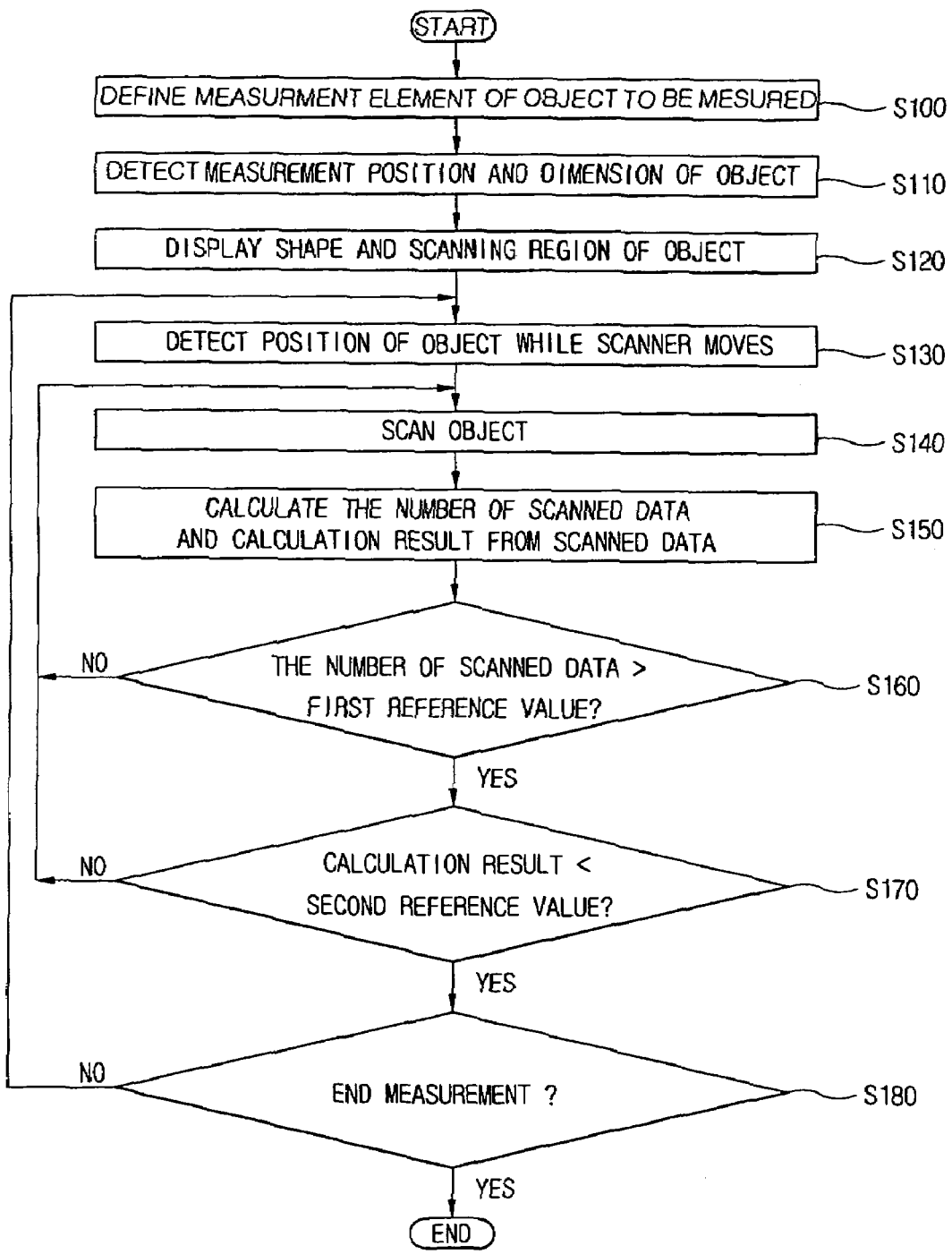
FIG. 4 is a flowchart of a method of guiding a real-time inspection using a 3D scanner according to the present invention.

FIG. 4 is a flowchart of a method of guiding a real-time inspection using a 3D scanner according to the present invention. Description of the method will be made with reference to FIGS. 1 and 4.

Shape information and a measurement element of an object to be measured are defined on the basis of design information of the object and stored in the data storage unit (300) (S100).

In step S100, the control unit (500) detects the shape information and the measurement element of the object defined and stored in the data storage unit (300) in step S110, sets the shape information of the object and a scanning region required for measuring the shape of the object from the shape information of the object and the measurement element of the object detected in step S110, outputs the set information and the set scanning region to the display unit in step S120, and detects measurement position and measurement dimension information of the object from the shape information and the measurement element of the object in step S130.

After step S130 is performed, the control unit (500) detects measurement information measured and transmitted by the 3D scanner (100) that measures the shape of the object in step S140. In step S140, the control unit (500) detects space-movement information such that the 3D scanner (100) moves so as to detect the object, analyzes the detected space-movement information, and judges whether the 3D scanner (100) is disposed at the vicinity of the object. In the case where the 3D scanner is disposed at the vicinity of the object, the control unit (500) displays that the object is an object to be measured through the display unit (400). On the contrary, in the case where the 3D scanner is not disposed at the vicinity of the object, the control unit (500) displays that the object is not an object to be measured through the display unit (400).

In step S140, the judgment as to whether the 3D scanner is disposed at the vicinity of the object is performed by calibrating a coordinate system of the shape information stored in the data storage unit (300) and a measurement coordinate system of the 3D scanner. That is, in step S140, the position of the 3D scanner (100) is compared with the position of the object to be measured, to display that the position of the 3D scanner (100) moves to the position of the object. Since a process of calibrating the coordinate system of the shape information and the measurement coordinate system is already well known in the art, detailed description thereof will be omitted.

Also, in step S140, the control unit (500) may superpose the shape information of the object measured from the 3D scanner (100) on the shape information stored in the data storage unit (300), for guiding measurement of the object and outputting the superposed information to the display unit (400). In that case, there is the advantage that an operator can recheck the measurement position, so that measurements can be performed more conveniently.

After step S140 is performed, the control unit (500) calculates the number of effective data and numerical information of the measurement element from the measurement information detected by the 3D scanner in step S150.

In step S150, the control unit (500) compares the number of effective data calculated from the measurement information of the 3D scanner (100) with the first reference value for judging the validity of the calculated number of effective data in step S160. The first reference value in step S160, which is the inspection information stored in the data storage unit (300), is the number of minimum effective data required for judging whether the measurement information detected by the 3D scanner is valid information.

When the number of effective data of the measurement information detected by the 3D scanner (100) is less than the first reference value in step S160, step S140 is performed again. On the contrary, when the number of effective data of the measurement information detected by the 3D scanner (100) is greater than the first reference value in step S160, the control unit (500) compares numerical information of the measurement element calculated from the measurement information with the second reference value for judging validity of the measured information in step S170. The second reference value in step S170, which is the inspection information stored in the data storage unit (300), is at least one of a desired dimension and an allowable tolerance for appraising a shape error of the measurement element on the basis of design information.

When the calculated result is greater than the second reference value in step S170, step S140 is performed again. On the contrary, when the calculated result is less than the second reference value in step S170, the control unit (500) judges whether to end the measurement of the object in step S180.

When there exists an additional measurement of an object in step S180, the control unit (500) performs step S110 and when there doesn't exist an additional measurement of an object in step S180, the inspection guide and the measurement of the object are ended.

As described above, the present invention has the advantage that an operator can accurately understand a designer's intentions for inspection to perform measurement.

Also, items intended for inspection by a designer can be conveniently inspected regardless of the dexterity of the operator manipulating the 3D scanner, so that an error in the inspection can be prevented.

Also, generation of a performance error (a data error which might occur during the process of performing measurement using a 3D scanner) is prevented, so that a more efficient inspection process can be provided.

The foregoing embodiment is merely exemplary and is not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A system of guiding a real-time inspection using a three dimensional (3D) scanner comprising:
    a scanner that detects 3D shape information of an object to be measured;
    a data storage unit that stores inspection guide information which leads to check inspection elements of said object to be measured which a designer of said object to be measured intended by an operator manipulating the scanner and inspection information of the object required for judging a validity of the 3D shape information detected by the scanner;
    a control unit that outputs the 3D shape information detected by the 3D scanner, that displays whether the 3D scanner is positioned in scanning region of an object to be measured during the movement with unifying shape information coordinate system stored at data storage unit and measurement coordinate system of the 3D scanner, and compares the 3D shape information detected by the 3D scanner with the inspection guide information to judge validity of the number of the detected measurement information and the numerical information of measurement elements; and
    a display unit that outputs the measurement information detected from the 3D scanner and the inspection guide information stored in the data storage unit.

2. The system according to claim 1, wherein the inspection guide information comprises shape information of the object, scanning region information used for measuring the object, and order information used for guiding a measurement process.

3. The system according to claim 2, wherein the shape information is design data modeled in a CAD (computer-aided design) program.

4. The system according to claim 1, wherein the inspection information comprises reference data information used for judging whether a number of data of the 3D shape information detected by the scanner is valid and allowable tolerance information used for appraising a shape error of the 3D shape information.

5. The system according to claim 1, wherein the data storage unit comprises at least one of a hard disk, a semiconductor memory, and a CD-ROM.

6. A method of guiding a real-time inspection using a three dimensional (3D) scanner comprising the steps of:
    (a) defining shape information of an object to be measured and a measurement element of the object which a designer intended and storing the same in a data storage unit;
    (b) outputting, at a control unit, shape inspection information and inspection guide information to a display unit using the shape information and the measurement element stored in the data storage unit;
    (c) unifying, at the control unit, shape information coordinate system stored at data storage unit and measurement coordinate system of the 3D scanner and measuring and detecting, at the control unit, shape measurement information of the object from a 3D scanner, when the 3D scanner is positioned in scanning region of an object to be measured;
    (d) judging, at the control unit, a validity of the number of data of the measurement information and numerical information of measurement elements; and
    (e) outputting, at the control unit, a result of the validity of the shape measurement information.

7. The method according to claim 6, wherein the step (b) comprises the steps of:
    detecting, at the control unit, measurement position and measurement dimension information of the object stored in the data storage unit; and
    setting shape information of the object and a scanning region required for measuring a shape of the object to output the set information and the set scanning region to the display unit.

8. The method according to claim 6, wherein the step (c) comprises the steps of:
    detecting, at the control unit, space-movement information detected from the 3D scanner;
    analyzing, at the control unit, the space-movement information detected from the 3D scanner to judge whether the 3D scanner is disposed in a vicinity of the object; and
    displaying, at the control unit, that the object is an object to be measured through the display unit if the 3D scanner is disposed in the vicinity of the object.

9. The method according to claim 8, wherein the step of judging whether the 3D scanner is disposed in the vicinity of the object comprises the step of:
    displaying, at the control unit, that the object is not an object to be measured through the display unit if the 3D scanner is not disposed in the vicinity of the object.

10. The method according to claim 6, wherein the step (c) comprises the step of:
    superposing, at the control unit, the shape measurement information on the shape information, for guiding measurement of the object and outputting the superposed information to the display unit.

11. The method according to claim 6, wherein the step (d) comprises the steps of:
    comparing, at the control unit, a number of data of the shape measurement information with a first reference value; and
    calculating, at the control unit, numerical information from the shape measurement information and comparing the numerical information with a second reference value for judging the validity of the shape measurement information if the number of data of the shape measurement information is valid as a result of the comparing.

12. The method according to claim 11, wherein if the number of data of the shape measurement information is not valid, the step (c) is performed.

13. The method according to claim 11, wherein if the numerical information is not valid, the step (c) is performed.

14. The method according to claim 6, wherein if there exists additional information of an object to be measured, the control unit performs the step (b).

15. A system of guiding a real-time inspection using a three dimensional (3D) scanner comprising:
- a scanner that detects 3D shape information of an object to be measured;
- a data storage unit that stores pre-determined inspection guide information associated with inspection elements of said object;
- a control unit that compares the 3D shape information detected by the scanner with the pre-determined inspection guide information and judges validity of the 3D shape information detected by the scanner; and
- a display unit that displays the 3D shape information detected by the scanner, the pre-determined inspection guide information stored in the data storage unit, and a result indicating the validity of the 3D shape information.

16. The system of claim 15, wherein the control unit judges the validity of the 3D shape information detected by the scanner by detecting, by the control unit, space-movement information detected from the 3D scanner;
- analyzing, by the control unit, the space-movement information detected from the 3D scanner to judge whether the 3D scanner is disposed in a vicinity of the object; and
- displaying, by the control unit, that the object is an object to be measured through the display unit if the 3D scanner is disposed in the vicinity of the object.

17. The system of claim 16, wherein the control unit judges the validity of the 3D shape information detected by the scanner further by
- comparing, by the control unit, a number of data of shape measurement information with a first reference value; and
- calculating, by the control unit, numerical information from the shape measurement information and comparing the numerical information with a second reference value for judging the validity of the shape measurement information if the number of data of the shape measurement information is valid as a result of the comparing.

* * * * *